United States Patent
Sumita et al.

(10) Patent No.: US 10,508,053 B2
(45) Date of Patent: Dec. 17, 2019

(54) IMAGE GUIDE FIBER

(71) Applicant: Sumita Optical Glass, Inc., Saitama-shi, Saitama (JP)

(72) Inventors: Nahoe Sumita, Saitama (JP); Hideaki Takaku, Saitama (JP); Takashi Watanabe, Saitama (JP)

(73) Assignee: Sumita Optical Glass, Inc., Saitama-shi, Saitama (JP)

(*) Notice: Subject to any disclaimer, the term of this patent is extended or adjusted under 35 U.S.C. 154(b) by 0 days.

(21) Appl. No.: 16/074,173

(22) PCT Filed: May 20, 2016

(86) PCT No.: PCT/JP2016/002468
§ 371 (c)(1),
(2) Date: Jul. 31, 2018

(87) PCT Pub. No.: WO2017/134702
PCT Pub. Date: Aug. 10, 2017

(65) Prior Publication Data
US 2019/0270667 A1      Sep. 5, 2019

(30) Foreign Application Priority Data

Feb. 2, 2016     (JP) ................. 2016-018122

(51) Int. Cl.
C03C 13/04      (2006.01)
G02B 6/02       (2006.01)
C03C 3/093      (2006.01)

(52) U.S. Cl.
CPC .......... *C03C 13/046* (2013.01); *C03C 3/093* (2013.01); *G02B 6/02* (2013.01)

(58) Field of Classification Search
CPC ................................................ G02B 6/02
See application file for complete search history.

(56) References Cited

U.S. PATENT DOCUMENTS

| | | | |
|---|---|---|---|
| 8,546,282 B2* | 10/2013 | Kinoshita | C03C 3/068 501/37 |
| 8,579,803 B2 | 11/2013 | Kinoshita et al. | |
| 2004/0220038 A1* | 11/2004 | Wolff | C03C 3/062 501/64 |

(Continued)

FOREIGN PATENT DOCUMENTS

| JP | S6084506 A | 5/1985 |
|---|---|---|
| JP | S60141643 A | 7/1985 |

(Continued)

OTHER PUBLICATIONS

Machine translation of the Japanese publication JP08-015535A, dated 1996. (Year: 1996).*

(Continued)

*Primary Examiner* — Sung H Pak
(74) *Attorney, Agent, or Firm* — Kenja IP Law PC

(57) ABSTRACT

Provided is an image guide fiber that improves image quality while preventing a manufacturing problem. The image guide fiber according to the present disclosure has a numerical aperture NA in the range of 0.70 to 0.90. A linear thermal expansion coefficient difference $\Delta\alpha$, which is a value obtained by subtracting a linear thermal expansion coefficient $\alpha_2$ at from 100 to 300° C. of clad glass, from a linear thermal expansion coefficient $\alpha_1$ at from 100 to 300° C. of core glass, is in the range of $-3\times10^{-7}$° C. to $15\times10^{-7}$/° C. A glass-transition temperature $Tg_1$ of the core glass is higher than a glass-transition temperature $Tg_2$ of the clad glass. A core occupancy area ratio is 25% or more. A pixel density is 0.1 pixel/$\mu m^2$ or more.

5 Claims, 3 Drawing Sheets

(56) References Cited

U.S. PATENT DOCUMENTS

2012/0289779 A1 11/2012 Kinoshita et al.
2013/0211262 A1* 8/2013 Suga .................... G01N 21/474
                                                                  600/478
2015/0353407 A1 12/2015 Yamaguchi

FOREIGN PATENT DOCUMENTS

| JP | S6153608 A | 3/1986 |
|---|---|---|
| JP | S6321231 A | 1/1988 |
| JP | H0815535 A | 1/1996 |
| JP | 2005222087 A | 8/2005 |
| JP | 5153963 B2 | 2/2013 |
| TW | 201500786 A | 1/2015 |
| WO | 2012050116 A1 | 4/2012 |

OTHER PUBLICATIONS

Mar. 26, 2019, Office Action issued by the Intellectual Property Office of Singapore in the corresponding Singaporean Patent Application No. 11201806353U.

Jul. 19, 2017, Office Action issued by the Taiwan Intellectual Property Office in the corresponding Taiwanese Patent Application No. 105115718.

Jun. 21, 2016, International Search Report issued in the International Patent Application No. PCT/JP2016/002468.

Aug. 7, 2018, International Preliminary Report on Patentability issued in the International Patent Application No. PCT/JP2016/002468.

Jun. 3, 2019, Office Action issued by the China National Intellectual Property Administration in the corresponding Chinese Patent Application No. 201680062194.5 with English language Concise Explanation of the Relevance.

Sep. 25, 2019, the Extended European Search Report issued by the European Patent Office in the corresponding European Patent Application No. 16889193.5.

Sep. 11, 2019, Office Action issued by the China National Intellectual Property Administration in the corresponding Chinese Patent Application No. 201680062194.5.

Oct. 21, 2019, Office Action issued by the Korean Intellectual Property Office in the corresponding Korean Patent Application No. 10-2018-7012429.

* cited by examiner

IMAGE GUIDE FIBER

TECHNICAL FIELD

The present disclosure relates to an image guide fiber suitably used for image transmission in, for example, an endoscope for medical or industrial applications.

BACKGROUND

Generally, in an image guide fiber including a plurality of cores and a clad which is common to the plurality of cores, higher pixel density equates to greater image resolution, and higher core occupancy area ratio equates to greater brightness. Reducing core diameter for higher pixel density decreases core occupancy area ratio. Accordingly, to increase both pixel density and core occupancy area ratio for improving image quality, it is effective to reduce the thickness of the clad between adjacent cores (the distance between adjacent cores). However, too small a thickness of the clad between adjacent cores tends to cause crosstalk of transmitted light, possibly hindering the sufficient improvement of image quality. The minimum thickness of the clad between adjacent cores that is sufficient to fully prevent crosstalk depends on the numerical aperture NA of the image guide fiber. A higher numerical aperture NA makes it possible to reduce the minimum thickness the clad between adjacent cores that is sufficient to fully prevent crosstalk.

One conventionally proposed method for increasing the numerical aperture NA is to make the image guide fiber of multi-component glass (as described in, for example, Patent Literature 1).

CITATION LIST

Patent Literature

PTL 1: JP 2005222087A

SUMMARY

Technical Problem

However, in cases where the numerical aperture NA is increased by making the image guide fiber of multi-component glass, there needs to be a significant difference in refractive index between glass (which may also be called the "core glass" below) constituting the cores and glass (which may also be called the "clad glass" below) constituting the clad, and accordingly, the composition of the core glass needs to be significantly different from the composition of the clad glass. The significant difference in composition between the core glass and the clad glass may also result in a significant difference in various physical properties between the core glass and the clad glass, and this might pose a manufacturing problem of the image guide fiber.

Thus, the present disclosure has been conceived in view of the above respect, and the present disclosure is to provide an image guide fiber that improves image quality while preventing the manufacturing problem.

Solution to Problem

One of aspects of the present disclosure resides in an image guide fiber including a plurality of cores and a clad which is common to the plurality of cores, wherein the cores and the clad are each made of multi-component glass, the image guide fiber has a numerical aperture NA in the range of 0.70 to 0.90, a linear thermal expansion coefficient difference $\Delta\alpha$, which is a value obtained by subtracting a linear thermal expansion coefficient $\alpha_2$ at from 100° C. to 300° C. of a clad glass of the clad, from a linear thermal expansion coefficient $\alpha_1$ at from 100° C. to 300° C. of a core glass of the core, is in the range of $-3\times10^{-7}$/° C. to $15\times10^{-7}$/° C., a glass-transition temperature $Tg_1$ of the core glass is higher than a glass-transition temperature $Tg_2$ of the clad glass, in a section of the image guide fiber, a core occupancy area ratio is 25% or more, where the core occupancy area ratio is a ratio of a total area of the plurality of cores to an area of a screen portion defined by an outer circumferential edge of the clad, and in the section of the image guide fiber, a pixel density is 0.1 pixel/$\mu m^2$ or more, where the pixel density is the number of pixels per unit area of the screen portion.

The image guide fiber according to the present disclosure improves image quality while preventing the manufacturing problem.

In a preferred embodiment of the image guide fiber according to the present disclosure, the core glass has a refractive index $nd_1$ in the range of 1.690 to 1.745, the glass-transition temperature $Tg_1$ of 605° C. or more, and the linear thermal expansion coefficient $\alpha_1$ at from 100° C. to 300° C. of $86\times10^{-7}$/° C. or more.

With the above configuration, it is further ensured that image quality is improved while the manufacturing problem is prevented.

In another preferred embodiment of the image guide fiber according to the present disclosure, the core glass has a composition, expressed in mol %, containing $SiO_2$: 36% to 48%, $B_2O_3$: 7% to 19%, $Al_2O_3$: 0% to 3.5%, ZnO: 0% to 4%, CaO: 0% to 4.5%, SrO: 0% to 4.5%, BaO: 20% to 33%, $La_2O_3$: 4% to 8%, $Ta_2O_5$: 0.5% to 3.5%, $ZrO_2$: 0.5% to 7%, $Li_2O$: 0% to 8%, $Na_2O$: 0% to 5%, and $K_2O$: 0% to 5%, wherein a total percentage of $Li_2O$, $Na_2O$, and $K_2O$ is from 0% to 8%.

With the above configuration, it is further ensured that image quality is improved while the manufacturing problem is prevented.

In yet another preferred embodiment of the image guide fiber according to the present disclosure, the clad glass has a refractive index $nd_2$ in the range of 1.490 to 1.530, the glass-transition temperature $Tg_2$ of 570° C. or less, and the linear thermal expansion coefficient $\alpha_2$ at from 100° C. to 300° C. of $95\times10^{-7}$/° C. or less.

With the above configuration, it is further ensured that image quality is improved while the manufacturing problem is prevented.

In yet another preferred embodiment of the image guide fiber according to the present disclosure, the clad glass has a composition,
expressed in mol %, containing
$SiO_2$: 46% to 67%,
$B_2O_3$: 7% to 20%,
$Al_2O_3$: 1% to 15%,
MgO: 0% to 12%,
CaO: 0% to 10%,
ZnO: 0% to 11%,
$Li_2O$: 0% to 6%,
$Na_2O$: 2% to 20%, and
$K_2O$: 0% to 9%, wherein
a total percentage of MgO, CaO, and ZnO is from 3% to 14%, and
a total percentage of $Li_2O$, $Na_2O$, and $K_2O$ is from 6% to 24%.

With the above configuration, it is further ensured that image quality is improved while the manufacturing problem is prevented.

Advantageous Effect

According to the present disclosure, an image guide fiber that improves image quality while preventing the manufacturing problem is provided.

DETAILED DESCRIPTION

One of embodiments of the present disclosure will be described below for illustration with reference to the drawings.

[Endoscope Using Image Guide Fiber]

An image guide fiber (which may also be simply called the "fiber" below) according to the present disclosure may be used for image transmission in, for example, an endoscope for medical or industrial applications.

Figure 1:
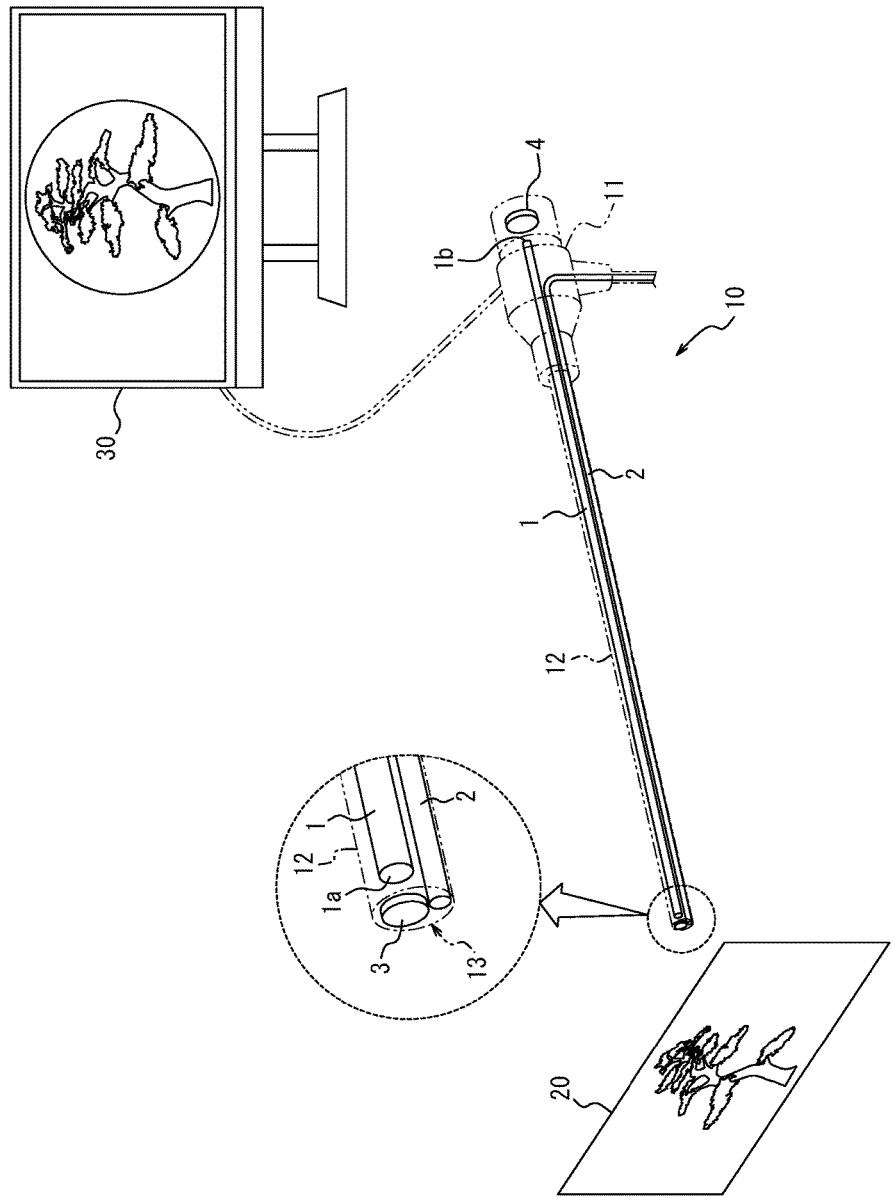
FIG. 1 is a schematic view illustrating an example of a scope of a medical endoscope in which an image guide fiber according to the present disclosure may be used.

FIG. 1 illustrates an example of a scope 10 of a medical endoscope. The scope 10 includes an operation portion 11 and an insertion portion 12 that is flexible. The insertion 12 includes, on a front end side thereof (i.e., on a side thereof that is opposite to the operation portion 11), a front end portion 13. The insertion portion 12 also includes, on the side of the front end portion 13, an objective lens 3. The operation portion 11 includes an ocular lens 4. In the example of FIG. 1, an image guide fiber 1 according to the one of embodiments of the present disclosure extends over the insertion portion 12 and the operation portion 11 between the objective lens 3 and the ocular lens 4. Furthermore, a light guide fiber 2 extends over the insertion portion 12 and the operation portion 11. In the example of FIG. 1, the scope 10 is connected to a monitor 30. An image of an observed object 20 is formed on an incident end surface 1a of the image guide fiber 1 via the objective lens 3, and the formed image is transmitted through the image guide fiber 1 to be emitted from an emission end surface 1b of the image guide fiber 1, and then, outputted to the monitor 30 via the ocular lens 4.

However, the image guide fiber 1 according to the present embodiment is not necessarily used in a medical endoscope as in the example of FIG. 1 and may also be used for image transmission in, for example, an industrial endoscope. Furthermore, the use of the image guide fiber according to the present embodiment is not limited to image transmission, and the image guide fiber may also be used for power delivery (light transmission) in a medical or an industrial device. In this case, examples of applications include transmission of laser light or the like in photodynamic therapy, that is, a treatment of lesions, such as cancer and infection, that introduces a photosensitizing agent into target tissues before the body tissues are irradiated with a specific wavelength of light to produce active oxygen, and also include transmission of lamp, LED, and laser light used for illumination.

<Configuration of Image Guide Fiber>

Figure 2:
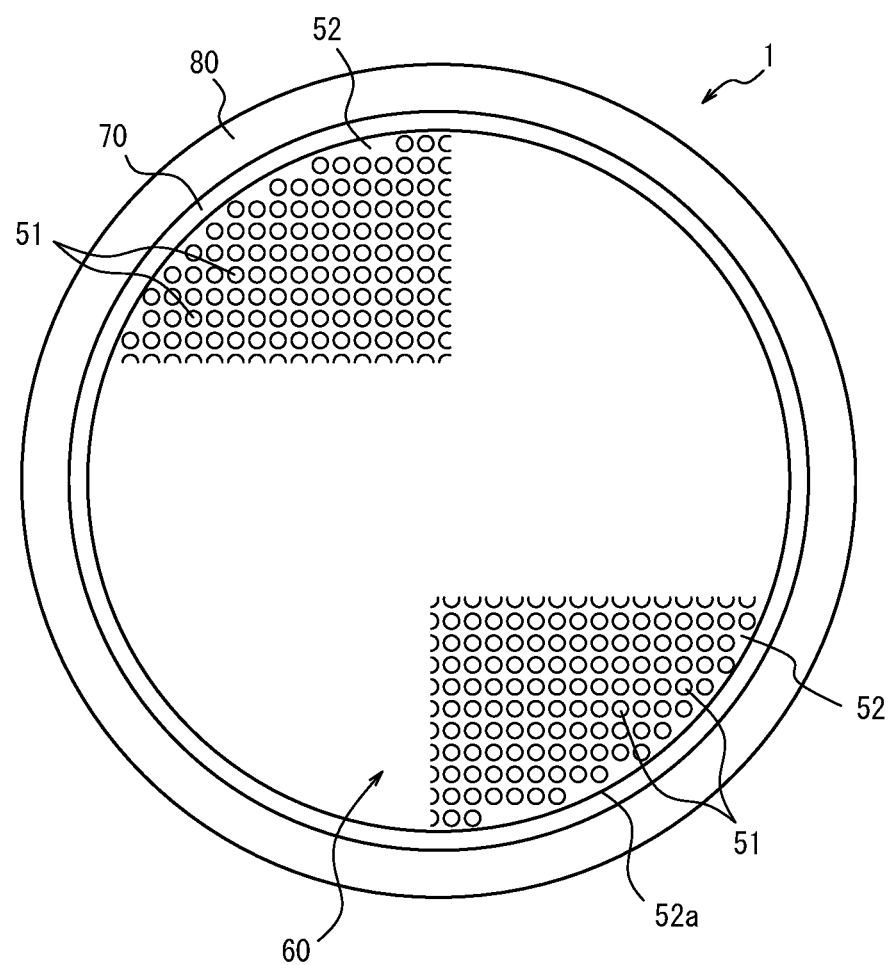
FIG. 2 is a sectional view illustrating an image guide fiber according to one of embodiments of the present disclosure.

Next, with reference to FIG. 2, a description is given of a configuration of the image guide fiber 1 according to the present embodiment. FIG. 2 illustrates an example of a section of the fiber 1 according to the present embodiment. Additionally, the fiber 1, on end surfaces on both ends thereof, also has the same configuration as the illustrated section.

The fiber 1 includes a plurality of cores 51 and a clad 52 which is common to the plurality of cores 51. The clad 52 covers an outer circumferential surface of each core 51. As described later, the cores 51 and the clad 52 are each made of multi-component glass. In the example of FIG. 2, each core 51, in a section thereof, has a circular shape, and the clad 52 has an outer circumferential edge 52a that, in a section thereof, has a circular shape. Furthermore, in the example of FIG. 2, the fiber 1 includes a glass jacket layer 70, which covers an outer circumferential surface of the clad 52, and a resin (e.g., polyimide) coat layer 80, which covers the jacket layer 70.

Additionally, although in FIG. 2 the cores 51 are partially omitted, the cores 51 are arranged throughout the entire region of the clad 52 that is common thereto.

However, the configuration of the fiber 1 according to the present embodiment is not limited to the example of FIG. 2 and may be any configuration, in which the fiber 1 includes the plurality of cores 51 and the clad 52 that is common thereto.

Figure 3A:
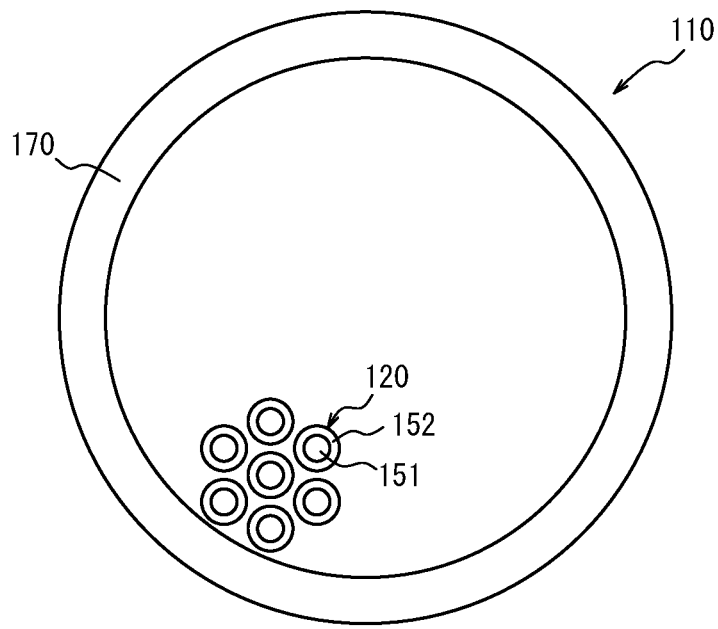
FIGS. 3A and 3B illustrate an example of a method of manufacturing an image guide fiber according to the one of embodiments of the present disclosure.
Figure 3B:
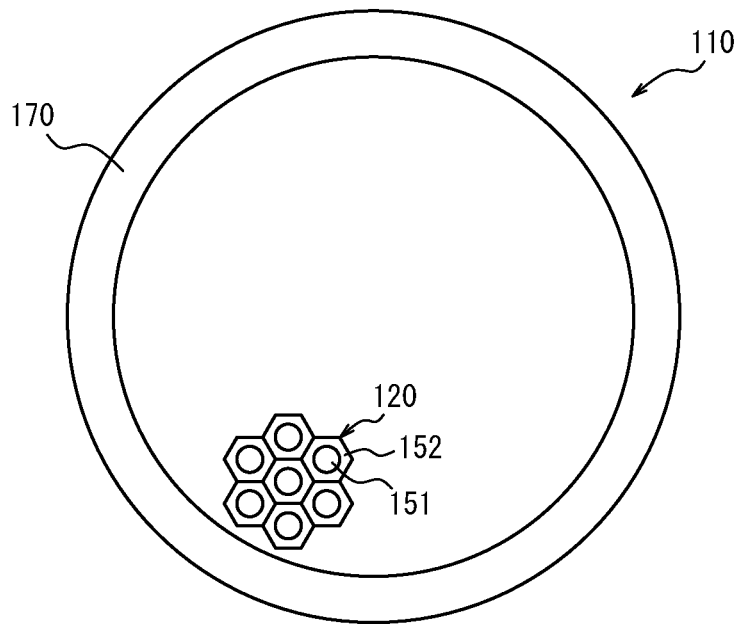

Next, with reference to FIGS. 3A and 3B, a description is given of an example of a method of manufacturing the fiber 1 according to the present embodiment.

To start with, the core glass and the clad glass are prepared.

After that, by primary spinning according to the double-crucible method, a single core fiber, including the core glass and the clad glass covering the core glass that are arranged concentrically, is obtained. The double-crucible method uses two concentric crucibles, one for the cores and the other for the clad. The core glass and the clad glass in the crucibles are heated, and the single core fiber is continuously drawn (spun) from a nozzle of the two crucibles.

Subsequently, the single core fiber is cut into pieces each having a predetermined length, and defectives in the pieces of the cut single core fiber are removed. Then, as illustrated in FIG. 3A, approximately 10,000 to 50,000 remaining pieces of the cut single core fiber 120 are bundled (stacked) in hexagonal close-packed arrangements in a cylindrical-shaped glass tube 170, and thus, a single core fiber bundle 110 is obtained. The number of stacked pieces of the single core fiber 120 corresponds to the number of pixels of the image guide fiber 1. The glass tube 170 is made of glass constituting the jacket layer 70 of the image guide fiber 1, and at this time, the outer diameter may be from 3 to 5 cm, and the overall length may be 16 cm. In FIGS. 3A and 3B, reference numerals 151 and 152 respectively denote the core glass and the clad glass of the single core fiber 120. Additionally, although in FIGS. 3A and 3B the pieces of the single core fiber 120 are partially omitted, the pieces of the single core fiber 120 are arranged throughout the entire region of the glass tube 170.

Subsequently, as illustrated in FIG. 3B, the single core fiber bundle 110 is heated for thermal fusion. At this time, a sectional shape of an outer circumferential edge of each piece of the single core fiber 120 changes from a circular to a hexagonal shape, and a gap between each piece of the single core fiber 120 is filled. Thus, the glass tube 170 and each piece of the single core fiber 120 are integrated. After the integration, slow cooling at a predetermined temperature and a predetermined temperature gradient is performed to obtain a preform in the form of a glass bar.

Subsequently, an outer circumferential side of the preform is ground and polished to mold the preform into a cylindrical shape.

Subsequently, the preform is heated and stretched and thinned (i.e., secondary spinning) and then, coated with a resin constituting the coat layer 80 of the fiber 1.

Thus, the image guide fiber 1 is manufactured.

The manufactured image guide fiber 1 has an outer diameter (i.e., an outer diameter of the coat layer 80) of, for example, from 300 to 800 µm.

However, the fiber 1 according to the present embodiment may also be manufactured by any method other than the manufacturing method described above.

Referring back to FIG. 2, a further description is given of the configuration of the fiber 1 according to the present embodiment. The fiber 1 according to the present embodiment that includes the cores 51 and the clad 52, which are each made of multi-component glass, satisfies the following conditions (1) to (5).

(1) The numerical aperture NA of the fiber 1 is in the range of 0.70 to 0.90.

(2) A linear thermal expansion coefficient difference $\Delta\alpha$ ($=\alpha_1-\alpha_2$), which is a value obtained by subtracting a linear thermal expansion coefficient $\alpha_2$ at from 100 to 300° C. of the glass constituting the clad 52, from a linear thermal expansion coefficient $\alpha_1$ at from 100 to 300° C. of the glass constituting the cores 51, is in the range of $-3\times10^{-7}$/° C. to $15\times10^{-7}$/° C.

(3) A glass-transition temperature $Tg_1$ of the glass constituting the cores 51 is higher than a glass-transition temperature $Tg_2$ of the glass constituting the clad 52.

(4) In a section of the fiber 1, a core occupancy area ratio is 25% or more, where the core occupancy area ratio is a ratio of a total area of the cores 51 to an area of the screen portion 60 defined by an outer circumferential edge 52a of the clad 52.

(5) In the section of the fiber 1, a pixel density is 0.1 pixel/µm² or more, where the pixel density is the number of pixels per unit area of the screen portion 60.

Regarding the condition (1), provided that a refractive index of the core glass is $nd_1$ and that a refractive index of the clad glass is $nd_2$, the numerical aperture NA of the fiber 1 is obtained by the following Formula I.

$$NA = \sqrt{nd_1^2 - nd_2^2} \qquad \text{(Formula I)}$$

The refractive index $nd_1$ of the core glass and the refractive index $nd_2$ of the clad glass refer to values obtained by measurement using the "measuring method for refractive index of optical glass" specified by the Japan Optical Glass Manufacturers' Association.

By increasing the numerical aperture NA as in the condition (1), the thickness of the clad 52 between adjacent cores 51 is reduced while fully preventing crosstalk of transmitted light. Accordingly, the core occupancy area ratio and the pixel density are increased as in the conditions (4) and (5), and this in turn improves image quality.

In cases where the numerical aperture NA is less than 0.70, the thickness of the clad 52 between adjacent cores 51 needs to be increased to prevent crosstalk, and the core occupancy area ratio and the pixel density cannot be increased sufficiently. In cases where the numerical aperture NA is more than 0.90, the refractive index $nd_1$ of the core glass needs to be increased significantly, and this may be a cause of a decrease in short-wavelength transmittance of the fiber 1.

From the same perspectives, the numerical aperture NA of the fiber 1 is preferably in the range of 0.717 to 0.860 and more preferably in the range of 0.717 to 0.780.

Regarding the condition (2), the linear thermal expansion coefficient $\alpha_1$ at from 100 to 300° C. of the core glass and the linear thermal expansion coefficient $\alpha_2$ at from 100 to 300° C. of the clad glass refer to values obtained by measurement according to the "measuring method for thermal expansion of optical glass" (using a differential thermal dilatometer [TMA] including a quartz glass standard sample support) specified by the Japan Optical Glass Manufacturers' Association.

Setting the linear thermal expansion coefficient difference $\Delta\alpha$ as defined in the condition (2) mitigates strain occurring in the fiber and eventually, prevents breakage of the fiber at the time of manufacturing the fiber 1.

In cases where the linear thermal expansion coefficient difference $\Delta\alpha$ is more than $15\times10^{-7}$/° C., significant strain is applied in a cooling process, performed after the glass tube 170 and each piece of the single core fiber 120 are integrated by the thermal fusion of the single core fiber bundle 110 at the time of manufacturing the fiber 1. This might lead to breakage of the fiber. In cases where the linear thermal expansion coefficient difference $\Delta\alpha$ is less than $-3\times10^{-7}$/° C., it is unlikely that strain can be removed in the cooling process.

From the same perspectives, the linear thermal expansion coefficient difference $\Delta\alpha$ is preferably in the range of $-3\times10^{-7}$/° C. to $9\times10^{-7}$/° C. and more preferably in the range of $-3\times10^{-7}$/° C. to $5\times10^{-7}$/° C.

Regarding the condition (3), the glass-transition temperature $Tg_1$ of the core glass and the glass-transition temperature $Tg_2$ of the clad glass refer to values obtained by measurement according to the "measuring method for thermal expansion of optical glass" (using a differential thermal dilatometer [TMA] including a quartz glass standard sample support) specified by the Japan Optical Glass Manufacturers' Association.

By satisfying the relation between the glass-transition temperature $Tg_1$ of the core glass and the glass-transition temperature $Tg_2$ of the clad glass as defined in the condition (3), when the glass tube 170 and each piece of the single core fiber 120 are integrated by the thermal fusion of the single core fiber bundle 110 at the time of manufacturing the fiber 1, only the clad glass 152 is deformable. This ensures that the circular shape in the section of the core glass 151 is maintained and eventually, prevents degradation of image quality.

In cases where the glass-transition temperature $Tg_1$ of the core glass is less than or equal to the glass-transition temperature $Tg_2$ of the clad glass, when the glass tube 170 and each piece of the single core fiber 120 are integrated by the thermal fusion of the single core fiber bundle 110 at the time of manufacturing the fiber 1, the core glass 151 may be deformable prior to the clad glass 152, and when the clad glass 152 is deformed, the core glass 151 might not be able to maintain the circular shape in the section thereof, and this may in turn lead to degradation in image quality.

A value $(Tg_1-Tg_2)$ obtained by subtracting the glass-transition temperature $Tg_2$ of the clad glass from the glass-transition temperature $Tg_1$ of the core glass is preferably from 120 to 170° C. and more preferably from 120 to 150° C.

Regarding the condition (4), "in a section of the fiber 1, an area of the screen portion 60 defined by an outer circumferential edge 52*a* of the clad 52" equals a sum of the area of the clad 52 and the total area of the cores 51 in the section of the fiber 1.

Increasing the core occupancy area ratio as defined in the condition (4) helps enhance brightness of an image and eventually, improves image quality.

In cases where the core occupancy area ratio of the fiber 1 is less than 25%, light transmittance is decreased, and a darker image is obtained.

On the other hand, in cases where the core occupancy area ratio of the fiber 1 is too high, a sufficiently high pixel density cannot be achieved. Accordingly, the core occupancy area ratio of the fiber 1 is preferably in the range of 25 to 50% and more preferably in the range of 30 to 50%.

Regarding the condition (5), the number of pixels in the fiber 1 equals the number of cores 51 in the fiber 1. The pixel density refers to a value obtained by dividing the number of pixels in the fiber 1 by the area of the screen portion 60 in the section of the fiber 1.

Increasing the pixel density as defined in the condition (5) helps enhance resolution of an image and eventually, improves image quality.

In cases where the pixel density of the fiber 1 is less than 0.1 pixel/$\mu m^2$, a sufficient resolution cannot be achieved.

On the other hand, an attempt to increase the pixel density excessively may cause an excessive decrease in the thickness of the clad 52 between adjacent cores 51 and may also cause an excessive decrease in the core occupancy area ratio. Accordingly, the pixel density of the fiber 1 is preferably in the range of 0.1 to 0.5 pixel/$\mu m^2$ and more preferably in the range of 0.2 to 0.4 pixel/$\mu m^2$.

According to the fiber 1 of the present embodiment, by increasing the numerical aperture NA, the core occupancy area ratio, and the pixel density as defined in the conditions (1), (4), and (5), the brightness and the resolution of an image are increased while crosstalk is fully prevented, and thus, image quality is improved. Furthermore, although the refractive index, and accordingly, the composition of the multi-component glass constituting the cores 51 need to be significantly different from those of the multi-component glass constituting the clad 52 to increase the numerical aperture NA as defined in the condition (1), the manufacturing problem of the fiber resulting from the differences is prevented by the conditions (2) and (3).

In the following, the physical properties and the composition of the core glass and those of the clad glass that are preferable for the fiber 1 to satisfy the conditions (1) to (5) are described in this order.

[Physical Properties of Core Glass]

By increasing the refractive index $nd_1$ of the core glass, the numerical aperture NA of the fiber 1 is increased. From the above perspective, the refractive index $nd_1$ of the core glass is preferably 1.690 or more.

On the other hand, an excessively high refractive index $nd_1$ of the core glass decreases transmittance at short-wavelength of the core glass. From the perspective of maintaining color reproductivity of the fiber 1, the refractive index $nd_1$ of the core glass is preferably 1.745 or less.

From the same perspective, the refractive index $nd_1$ of the core glass is more preferably from 1.695 to 1.715 and even more preferably from 1.698 to 1.710.

In cases where the glass-transition temperature $Tg_1$ of the core glass is too low, when the glass tube 170 and each piece of the single core fiber 120 are integrated by the thermal fusion of the single core fiber bundle 110 at the time of manufacturing the fiber 1, the core glass 151 is easily deformed and might not be able to maintain the circular shape in the section of the core. From the above perspective, the glass-transition temperature $Tg_1$ of the core glass is preferably 605° C. or more.

On the other hand, in cases where the glass-transition temperature $Tg_1$ of the core glass is too high, a spinning temperature for obtaining fiber in a spinning process is increased at the time of manufacturing the fiber 1, and this may degrade the quality of the image guide fiber 1 by, for example, inducing crystallization of the core glass. Accordingly, the glass-transition temperature $Tg_1$ of the core glass is preferably 690° C. or less.

From the same perspective, the glass-transition temperature $Tg_1$ of the core glass is more preferably from 630 to 710° C. and even more preferably from 640 to 680° C.

As described with respect to the condition (2), the linear thermal expansion coefficient $\alpha_1$ at from 100 to 300° C. of the core glass is limited by the relation with respect to the linear thermal expansion coefficient $\alpha_2$ at from 100 to 300° C. of the clad glass. The linear thermal expansion coefficient $\alpha_1$ at from 100 to 300° C. of the core glass is preferably $86\times10^{-7}$/° C. or more.

On the other hand, in cases where the linear thermal expansion coefficient $\alpha_1$ at from 100 to 300° C. of the core glass is too high, strain tends to remain in the integrated preform and is more likely to cause breakage of the preform at the time of manufacturing the fiber 1. Accordingly, the linear thermal expansion coefficient $\alpha_1$ at from 100 to 300° C. of the core glass is preferably $105\times10^{-7}$/° C. or less.

From the same perspective, the linear thermal expansion coefficient $\alpha_1$ at from 100 to 300° C. of the core glass is more preferably from $86\times10^{-7}$/° C. to $100\times10^{-7}$/° C. and even more preferably from $86\times10^{-7}$/° C. to $95\times10^{-7}$/° C.

[Composition of Core Glass]

The core glass preferably has a composition, expressed in mol %, containing $SiO_2$: 36 to 48%, $B_2O_3$: 7 to 19%, $Al_2O_3$: 0 to 3.5%, ZnO: 0 to 4%, CaO: 0 to 4.5%, SrO: 0 to 4.5%, BaO: 20 to 33%, $La_2O_3$: 4 to 8%, $Ta_2O_5$: 0.5 to 3.5%, $ZrO_2$: 0.5 to 7%, $Li_2O$: 0 to 8%, $Na_2O$: 0 to 5%, and $K_2O$: 0 to 5%, and the total percentage of $Li_2O$, $Na_2O$, and $K_2O$ is preferably from 0 to 8%.

A description is given below of the reason why the preferable range of the component composition of the core glass is defined as above. Note that, although the unit of the contents of the components in the glass composition is "mol %", the contents are expressed simply by "%" below unless otherwise specified.

Herein, in cases where the numerical range of the content of any component includes zero (0), the component is to be construed as an optional component.

<$SiO_2$>

$SiO_2$ is a component that permits formation of glass and that is effective for increasing the glass-transition temperature $Tg_1$. When the content of $SiO_2$ is less than 36%, it is difficult to obtain a glass-transition temperature $Tg_1$ of 605° C. or more. On the other hand, when the glass-transition temperature $Tg_1$ is more than 48%, it is difficult to obtain the core glass having a glass-transition temperature $Tg_1$ of 690° C. or less. Accordingly, the content of $SiO_2$ is preferably in the range of 36 to 48%. The content of $SiO_2$ is more preferably in the range of 36 to 45% and even more preferably in the range of 36 to 40%.

<$B_2O_3$>

$B_2O_3$ is a component that permits formation of glass and that is effective for reducing the glass-transition temperature $Tg_1$. When the content of $B_2O_3$ is less than 7%, it is difficult to obtain the core glass having a glass-transition temperature $Tg_1$ of 690° C. or less. On the other hand, when the content of $B_2O_3$ is more than 19%, it is difficult to obtain the core glass having a glass-transition temperature $Tg_1$ of 605° C. or more. Accordingly, the content of $B_2O_3$ is preferably in the range of 7 to 19%. The content of $B_2O_3$ is more preferably in the range of 12 to 19% and even more preferably in the range of 15 to 19%.

<$Al_2O_3$>

$Al_2O_3$ is a component that is effective for increasing the refractive index $nd_1$ and improving durability of the core glass. When the content of $Al_2O_3$ is high, although durability of the core glass is improved, the refractive index $nd_1$ is decreased. Accordingly, the content of $Al_2O_3$ is preferably in the range of 0 to 3.5%. The content of $Al_2O_3$ is more preferably in the range of 0 to 2.0% and even more preferably in the range of 0 to 1.5%.

<ZnO>

ZnO is a component that is effective for preventing an increase in the linear thermal expansion coefficient $\alpha_1$ at from 100 to 300° C. When the content of ZnO is 4% or less, the linear thermal expansion coefficient $\alpha_1$ at from 100 to 300° C. of the core glass is maintained to be $86 \times 10^{-7}$/° C. or more. Furthermore, since a highly pure ZnO material is not easily available, as the content of ZnO increases, the content of contaminating impurities also increases, and this results in degradation in transmittance of the core glass. Accordingly, the content of ZnO is preferably in the range of 0 to 4%. The content of ZnO is more preferably in the range of 0 to 2% and even more preferably in the range of 0 to 1%.

<CaO>

CaO is a component that is effective for increasing the refractive index $nd_1$. When the content of CaO is more than 4.5%, the refractive index $nd_1$ might exceed 1.745. Accordingly, the content of CaO is preferably in the range of 0 to 4.5%. The content of CaO is more preferably in the range of 0 to 4% and even more preferably in the range of 0 to 3.5%.

<SrO>

SrO is a component that is effective for increasing the refractive index $nd_1$. When the content of SrO is more than 4.5%, the refractive index $nd_1$ might exceed 1.745. Accordingly, the content of SrO is preferably in the range of 0 to 4.5%. The content of SrO is more preferably in the range of 0 to 4.2% and even more preferably in the range of 0 to 4%.

<ZnO+CaO+SrO>

The total content of ZnO, CaO, and SrO is preferably from 0 to 11%. When the total content of ZnO, CaO, and SrO is more than 11%, stability of glass is not favorable, and a manufacturing yield of the image guide fiber 1 might be decreased. The total content of ZnO, CaO, and SrO is more preferably in the range of 3 to 9% and even more preferably in the range of 5 to 7%.

<BaO>

BaO is a component that is effective for increasing the refractive index $nd_1$ and increasing the linear thermal expansion coefficient $\alpha_1$ at from 100 to 300° C. When the content of BaO is less than 20%, it is difficult to obtain a refractive index $nd_1$ of 1.690 or more, or to obtain the core glass having a linear thermal expansion coefficient $\alpha_1$ at from 100 to 300° C. of $86 \times 10^{-7}$/° C. or more. On the other hand, when the content of BaO is more than 33%, the refractive index $nd_1$ might exceed 1.745. Accordingly, the content of BaO is preferably in the range of 20 to 33%. The content of BaO is more preferably in the range of 23 to 30% and even more preferably in the range of 25 to 30%.

<$La_2O_3$>

$La_2O_3$ is effective for increasing the refractive index $nd_1$, improving durability of the core glass, and increasing the glass-transition temperature $Tg_1$. When the content of $La_2O_3$ is less than 4%, the refractive index $nd_1$ might be too low, or the glass-transition temperature $Tg_1$ might be too low. On the other hand, when the content of $La_2O_3$ is more than 8%, the refractive index $nd_1$ might exceed 1.745. Accordingly, the content of $La_2O_3$ is preferably in the range of 4 to 8%. The content of $La_2O_3$ is more preferably in the range of 4 to 7% and even more preferably in the range of 5 to 6%.

<$Ta_2O_5$>

$Ta_2O_5$ is a component that is effective for increasing the refractive index $nd_1$ and the glass-transition temperature $Tg_1$, improving stability of glass, and improving weather resistance of glass. When the content of $Ta_2O_5$ is less than 0.5%, the refractive index $nd_1$ might be too low, or the glass-transition temperature $Tg_1$ might be too low, and moreover, stability of glass might be degraded, and the manufacturing yield of the image guide fiber 1 might be decreased. On the other hand, when the content of $Ta_2O_5$ is more than 3.5%, the refractive index $nd_1$ might be too high, and accordingly, transmittance in short-wavelength range might be decreased, or the glass-transition temperature $Tg_1$ might exceed 690° C. Accordingly, the content of $Ta_2O_5$ is preferably in the range of 0.5 to 3.5%. The content of $Ta_2O_5$ is more preferably in the range of 0.5 to 2% and even more preferably in the range of 0.5 to 1.5%.

<$ZrO_2$>

$ZrO_2$ is a component that is effective for increasing the refractive index $nd_1$ and the glass-transition temperature $Tg_1$ and improving weather resistance of glass. When the content of $ZrO_2$ is less than 0.5%, the refractive index $nd_1$ might be too low, or the glass-transition temperature $Tg_1$ might be too low. On the other hand, when the content of $ZrO_2$ is more than 7%, the refractive index $nd_1$ might exceed 1.745, and moreover, stability of glass might be degraded, and the manufacturing yield of the image guide fiber 1 might be decreased. Accordingly, the content of $ZrO_2$ is preferably in the range of 0.5 to 7%. The content of $ZrO_2$ is more preferably in the range of 2 to 3.5% and even more preferably in the range of 2 to 3%.

<Li$_2$O>

Li$_2$O is a component that is effective for preventing an increase in the glass-transition temperature Tg$_1$. When the content of Li$_2$O is more than 8%, the glass-transition temperature Tg$_1$ might be less than 605° C. Accordingly, the content of Li$_2$O is preferably in the range of 0 to 8%. The content of Li$_2$O is more preferably in the range of 0 to 5% and even more preferably in the range of 0 to 3%.

<Na$_2$O>

Similarly to Li$_2$O, Na$_2$O is a component that is effective for preventing an increase in the glass-transition temperature Tg$_1$. When the content of Na$_2$O is more than 5%, the glass-transition temperature Tg$_1$ might be less than 605° C. Accordingly, the content of Na$_2$O is preferably in the range of 0 to 5%. The content of Na$_2$O is more preferably in the range of 0 to 4% and even more preferably in the range of 0 to 3%.

<K$_2$O>

Similarly to Li$_2$O and Na$_2$O, K$_2$O is a component that is effective for preventing an increase in the glass-transition temperature Tg$_1$. When the content of K$_2$O is more than 5%, the glass-transition temperature Tg$_1$ might be less than 605° C. Accordingly, the content of K$_2$O is preferably in the range of 0 to 5%. The content of K$_2$O is more preferably in the range of 0 to 2% and even more preferably in the range of 0 to 1%.

<Li$_2$O+Na$_2$O+K$_2$O>

When the total content of Li$_2$O, Na$_2$O, and K$_2$O is more than 8%, the glass-transition temperature Tg$_1$ might be less than 605° C. Accordingly, the total content of Li$_2$O, Na$_2$O, and K$_2$O is preferably in the range of 0 to 8%. The total content of Li$_2$O, Na$_2$O, and K$_2$O is more preferably in the range of 0 to 5% and even more preferably in the range of 0 to 3%.

[Physical Properties of Clad Glass]

When the refractive index nd$_2$ of the clad glass is sufficiently lower than the refractive index nd$_1$ of the core glass, the numerical aperture NA of the image guide fiber 1 may be increased even when the core glass having a relatively low refractive index nd$_1$ is used. From the above perspective, the refractive index nd$_2$ of the clad glass is preferably 1.530 or less.

However, an excessively low refractive index nd$_2$ of the clad glass increases the glass-transition temperature Tg$_2$ due to the compositional nature of clad glass, possibly resulting in an excessively low linear thermal expansion coefficient α$_2$ at from 100 to 300° C. To appropriately maintain the relation with respect to the core glass in terms of thermophysical properties, the refractive index nd$_2$ of the clad glass is preferably 1.490 or more.

When the glass-transition temperature Tg$_2$ of the clad glass is too high, the spinning temperature for obtaining fiber in the spinning process is increased at the time of manufacturing the fiber 1, and this may degrade the quality of the image guide fiber 1 by, for example, inducing crystallization of the glass. In consideration of the aforementioned condition (3) and the aforementioned preferable range of the glass-transition temperature Tg$_1$ of the core glass, the glass-transition temperature Tg$_2$ of the clad glass is preferably 570° C. or less.

On the other hand, when the glass-transition Tg$_2$ of the clad glass is too low, a difference from the glass-transition temperature Tg$_1$ of the core glass is increased excessively. This might cause only the clad to be softened first during the spinning process at the time of manufacturing the fiber 1. Accordingly, the glass-transition temperature Tg$_2$ of the clad glass is preferably 500° C. or more.

As described with respect to the condition (2), the linear thermal expansion coefficient α$_2$ at from 100 to 300° C. of the clad glass is limited by the difference from the linear thermal expansion coefficient α$_1$ at from 100 to 300° C. of the core glass. Since the preferable lower limit of the linear thermal expansion coefficient α$_1$ at from 100 to 300° C. of the core glass is 86×10$^{-7}$/° C., the linear thermal expansion coefficient α$_2$ at from 100 to 300° C. of the clad glass is preferably 71×10$^{-7}$/° C. or more.

On the other hand, when the linear thermal expansion coefficient α$_2$ at from 100 to 300° C. of the clad glass is too high, the linear thermal expansion coefficient α$_1$ at from 100 to 300° C. of the core glass needs to be set very high. In consideration of thermophysical properties of the core glass, the linear thermal expansion coefficient α$_2$ at from 100 to 300° C. of the clad glass is preferably 95×10$^{-7}$/° C. or less.

[Composition of Clad Glass]

The clad glass preferably has a composition, expressed in mol %, containing SiO$_2$: 46 to 67%, B$_2$O$_3$: 7 to 20%, Al$_2$O$_3$: 1 to 15%, MgO: 0 to 12%, CaO: 0 to 10%, ZnO: 0 to 11%, Li$_2$O: 0 to 6%, Na$_2$O: 2 to 20%, and K$_2$O: 0 to 9%. The total percentage of MgO, CaO, and ZnO is preferably from 3 to 14%, and the total percentage of Li$_2$O, Na$_2$O, and K$_2$O is preferably from 6 to 24%.

A description is given below of the reason why the preferable range of the component composition of the clad glass is defined as above.

<SiO$_2$>

SiO$_2$ is a component that is a main component essential for glass, that facilitates glass transition, and that is effective for reducing the linear thermal expansion coefficient α$_2$ at from 100 to 300° C. When the content of SiO$_2$ is less than 46%, the linear thermal expansion coefficient α$_2$ at from 100 to 300° C. might be too high. On the other hand, when the content of SiO$_2$ is more than 67%, the glass-transition temperature Tg$_2$ might be too high, and the linear thermal expansion coefficient α$_2$ at from 100 to 300° C. might be too low. Accordingly, the content of SiO$_2$ is preferably in the range of 46 to 67%. The content of SiO$_2$ is more preferably in the range of 49 to 64% and even more preferably in the range of 49 to 63%.

<B$_2$O$_3$>

B$_2$O$_3$ is a component that permits formation of glass, that is effective for reducing the glass-transition temperature Tg$_2$, and that is effective for reducing the linear thermal expansion coefficient α$_2$ at from 100 to 300° C. When the content of B$_2$O$_3$ is less than 7%, the linear thermal expansion coefficient α$_2$ at from 100 to 300° C. might be too high, exceeding 95×10$^{-7}$/° C. On the other hand, when the content of B$_2$O$_3$ is more than 20%, the linear thermal expansion coefficient α$_2$ at from 100 to 300° C. might be less than 71×10$^{-7}$/° C. Accordingly, the content of B$_2$O$_3$ is preferably in the range of 7 to 20%. The content of B$_2$O$_3$ is more preferably in the range of 10 to 18% and even more preferably in the range of 10.5 to 17%.

<Al$_2$O$_3$>

Al$_2$O$_3$ is a component that is effective for increasing the refractive index nd$_2$, increasing the glass-transition temperature Tg$_2$, and improving durability of the clad glass. When the content of Al$_2$O$_3$ is less than 1%, the effect of improving durability of the clad glass is weakened, and the glass-transition temperature Tg$_2$ is decreased. In contrast, when the content of Al$_2$O$_3$ is more than 15%, the glass-transition temperature Tg$_2$ might be too high. Accordingly, the content of Al$_2$O$_3$ is preferably in the range of 1 to 15%. The content of Al$_2$O$_3$ is more preferably in the range of 2 to 14% and even more preferably in the range of 3 to 12%.

<MgO>

MgO is a component that serves to decrease a melting temperature of glass, facilitate glass transition, and improve the refractive index. When the content of MgO is more than 12%, the refractive index $nd_2$ of the clad glass might exceed 1.530. Accordingly, the content of MgO is preferably in the range of 0 to 12%. The content of MgO is more preferably in the range of 0 to 10% and even more preferably in the range of 0 to 9%.

<CaO>

Similarly to MgO, CaO is a component that decreases a melting temperature of glass, that facilitates glass transition, and that is effective for increasing the refractive index $nd_2$. When the content of CaO is more than 10%, the refractive index $nd_2$ might exceed 1.530. Accordingly, the content of CaO is preferably in the range of 0 to 10%. The content of CaO is more preferably in the range of 0 to 8% and even more preferably in the range of 0 to 5%.

<ZnO>

Similarly to MgO and CaO, ZnO is a component that decreases a melting temperature of glass, that further facilitates glass transition, and that is effective for preventing an increase in the linear thermal expansion coefficient $\alpha_2$ at from 100 to 300° C. When the content of ZnO is more than 11%, the linear thermal expansion coefficient $\alpha_2$ at from 100 to 300° C. of the core glass might be less than $71 \times 10^{-7}/°$ C., and the glass-transition temperature $Tg_2$ might be too low. Accordingly, the content of ZnO is preferably in the range of 0 to 11%. The content of ZnO is more preferably in the range of 0 to 10% and even more preferably in the range of 0 to 8%.

<MgO+CaO+ZnO>

When the total content of MgO, CaO, and ZnO is more than 14%, the refractive index $nd_2$ of the clad glass might be too high, exceeding 1.530. On the other hand, when the total content of MgO, CaO, and ZnO is less than 3%, the linear thermal expansion coefficient $\alpha_2$ at from 100 to 300° C. might be more than $95 \times 10^{-7}/°$ C. The total content of MgO, CaO, and ZnO is preferably in the range of 3 to 14%. The content of ZnO is more preferably in the range of 3 to 10% and even more preferably in the range of 6 to 10%.

<Li$_2$O>

Alkali metal oxide, such as $Li_2O$, is a component that decreases a melting temperature of glass, that further facilitates glass transition, and that is effective for preventing an increase in the glass-transition temperature $Tg_2$. When the content of $Li_2O$ is more than 6%, the glass-transition temperature $Tg_1$ might be less than 500° C. Accordingly, the content of $Li_2O$ is preferably in the range of 0 to 6%. The content of $Li_2O$ is more preferably in the range of 0 to 4.5% and even more preferably in the range of 0 to 4%.

<Na$_2$O>

Similarly to $Li_2O$, $Na_2O$ is a component that is effective for preventing an increase in the glass-transition temperature $Tg_2$ and increasing the linear thermal expansion coefficient $\alpha_2$ at from 100 to 300° C. When the content of $Na_2O$ is less than 2%, the linear thermal expansion coefficient $\alpha_2$ at from 100 to 300° C. might be less than $71 \times 10^{-7}/°$ C. In contrast, when the content of $Na_2O$ is more than 20%, the linear thermal expansion coefficient $\alpha_2$ at from 100 to 300° C. might be more than $95 \times 10^{-7}/°$ C. Accordingly, the content of $Na_2O$ is preferably in the range of 2 to 20%. The content of $Na_2O$ is more preferably in the range of 3 to 18% and even more preferably in the range of 5 to 17.5%.

<K$_2$O>

Similarly to $Li_2O$ and $Na_2O$, $K_2O$ is a component that is effective for preventing an increase in the glass-transition temperature $Tg_1$ and increasing the linear thermal expansion coefficient $\alpha_2$ at from 100 to 300° C. When the content of $K_2O$ is more than 9%, the linear thermal expansion coefficient $\alpha_2$ at from 100 to 300° C. might be more than $95 \times 10^{-7}/°$ C. Accordingly, the content of $K_2O$ is preferably in the range of 0 to 9%. The content of $K_2O$ is more preferably in the range of 0 to 7% and even more preferably in the range of 0 to 5%.

<Li$_2$O+Na$_2$O+K$_2$O>

When the total content of $Li_2O$, $Na_2O$, and $K_2O$ is more than 24%, the linear thermal expansion coefficient $\alpha_2$ at from 100 to 300° C. might be more than $95 \times 10^{-7}/°$ C. When the total content of $Li_2O$, $Na_2O$, and $K_2O$ is less than 6%, the linear thermal expansion coefficient $\alpha_2$ at from 100 to 300° C. might be less than $71 \times 10^{-7}/°$ C. Accordingly, the total content of $Li_2O$, $Na_2O$, and $K_2O$ is preferably in the range of 6 to 24%. The total content of $Li_2O$, $Na_2O$, and $K_2O$ is more preferably in the range of 9 to 18.5% and even more preferably in the range of 12 to 17.5%.

Additionally, to improve melting properties and enhance stability of glass, the core glass and the clad glass may each also contain other components that are used in normal glass and are not described herein within the range by which the other components make up a total content of less than mol %, as long as the objective of the present disclosure is met. In this case, the content of each component is determined to achieve the total content of all the components, including the other components, of 100 mol/%.

[Method of Manufacturing Core Glass and Clad Glass]

Next, a description is given of an example of a method of manufacturing the core glass and the clad glass. Note that the method of manufacturing the core glass may be the same as the method of manufacturing the clad glass, and the core glass and the clad glass are simply called "glass" herein without distinction.

As formulation materials of glass, oxides, hydroxides, carbonates, nitrates, and the like corresponding to materials of the components of glass are weighed according to predetermined percentages and are mixed fully. Additionally, for preventing coloration of glass and for defoaming, an additive (such as $Sb_2O_3$) having a reduction effect may be added within the range of 1 mol % or less, which does not affect the advantageous effect of the present disclosure.

In manufacturing of glass, firstly, the glass formulation materials are put into a platinum crucible and melted in a glass melting furnace heated to from 1300 to 1500° C. Then, the glass melt melted at a high temperature is stirred with a stirring bar for clarification and homogenization and subsequently, poured into a mold preheated to an appropriate temperature. After that, gradual cooling is performed according to an appropriate temperature schedule, and thus, a glass block is obtained.

However, the core glass and the clad glass that are used for the fiber 1 according to the present embodiment may also be manufactured by any method other than the above manufacturing method.

EXAMPLES

Examples 1 to 7 of an image guide fiber according to the present disclosure and Comparative Examples 1 to 8 were prepared for assessment. Results of the assessment are described with reference to Tables 1 to 5. Table 1 shows details of Examples 1 to 7 and Comparative Examples 1 to 8.

Names listed in the row titled "core" in Table 1 correspond to names of cores 1 to 16 listed in Table 2 and to names of cores 17 to 33 listed in Table 3. Names listed in the row titled "clad" in Table 1 correspond to names of clads 1 to 16 listed in Table 4 and to names of clads 17 to 31 listed in Table 5. For example, Comparative Example Fiber 1 in Table 1 includes the core 1 in Table 2 and the clad 19 in Table 5.

Tables 2 and 3 show, for the cores 1 to 33, compositions, physical properties, and results of assessment of stability that is described later. Tables 4 and 5 show, for the clads 1 to 31, compositions, physical properties, and results of assessment of stability that are described later.

Comparative Example Fibers and Example Fibers were each manufactured with use of the corresponding core glass and clad glass as shown in Table 1 by the manufacturing method described above with reference to FIGS. 3A and 3B.

The screen portions 60 of Example Fibers had the same diameter (screen diameter). On the other hand, Comparative Example Fibers 2 and 4 to 8 had the same screen diameter, and Comparative Example Fibers 1 and 3 had different screen diameters from each other and also from those of Comparative Example Fibers 2 and 4 to 8

The contents of "numerical aperture NA", "linear thermal expansion coefficient difference $\Delta\alpha$ ($\times 10^{-7}/°$ C.)", "core glass-transition temperature $Tg_1$–clad glass-transition temperature $Tg_2$ (° C.)", "core occupancy area ratio (%)", and "pixel density (pixel/$\mu m^2$)" listed in Table 1 are as described above with respect to the conditions (1) to (5). Additionally, the core occupancy area ratio and the pixel density were calculated by observing and measuring the configurations of Comparative Example Fibers and Example Fibers.

In Table 1, "occurrence of cracks" indicates whether cracks occurred in a single core fiber bundle or a preform at the time of manufacturing a fiber. Any fiber in which cracks occurred was not subject to USAF chart test that is described below.

In Table 1, "result of USAF chart test" indicates a result of image quality assessment and test using 1951 USAF test patterns. In USAF chart test, a piece of paper on one side of which 1951 USAF test patterns were printed was prepared, and with the incident end surface of the fiber being in direct contact with the one side of the paper and with the other side of the paper being illuminated, an image of the 1951 USAF test patterns, emitted from the emission end surface of the fiber, was outputted to a monitor for observation. The same range of field of view (observation) of the 1951 USAF test patterns was adopted for Comparative Example Fibers and Example Fibers. Then, results of the observation of the 1951 USAF test patterns were assessed relatively. Table 1 shows, as results of the assessment, "excellent", "good", "fair", and "poor", which have the relation "excellent">"good">"fair">"poor" in a descending order from "good image quality" to "bad image quality".

The cores 1 to 33 shown in Tables 2 and 3 were each obtained through glass transition of the corresponding composition by a normal melt quenching method. In detail, as material compounds of each core, $SiO_2$, $H_3BO_3$, $Al(OH)_3$, ZnO, $CaCO_3$, $SrCO_3$, $BaCO_3$, $Ba(NO_3)_2$, $La_2O_3$, $Ta_2O_5$, $Nb_2O_5$, $ZrO_2$, $Li_2CO_3$, $Na_2CO_3$, and $K_2CO_3$ were weighed according to predetermined percentages. At this time, 0.05 mol % of $Sb_2O_3$ was added as a defoaming agent. These components were mixed and subsequently, melted for approximately 2 hours in a glass melting furnace at 1300° C. by using a platinum crucible. During the melting, the melt was homogenized by stirring timely. Subsequently, the melt was poured into a mold and gradually cooled to a room temperature, and thus, the core glass was obtained.

To check thermal properties and optical properties of the obtained core glass, the refractive index $nd_1$, the glass-transition temperature $Tg_1$, and the linear thermal expansion coefficient $\alpha_2$ at from 100 to 300° C. were measured. Tables 2 and 3 show the results.

In Tables 2 and 3, "stability" indicates a result of assessment of core glass stability. While the aforementioned stirring was performed for 2 minutes, when crystallization of glass was confirmed visually, the core glass was assessed as "bad", and when crystallization of glass was not confirmed visually, the core glass was assessed as "good".

The clads 1 to 31 shown in Tables 4 and 5 were each obtained through glass transition of the corresponding composition by the normal melt quenching method. In detail, as material compounds of each clad, $SiO_2$, $H_3BO_3$, $Al(OH)_3$, MgO, $CaCO_3$, ZnO, $Li_2CO_3$, $Na_2CO_3$, and $K_2CO_3$ were weighed according to predetermined percentages. At this time, 0.1% mol % of $Sb_2O_3$ was added as a defoaming agent. These components were mixed and subsequently, melted for approximately 2 hours in a glass melting furnace at 1450° C. by using a platinum crucible. During the melting, the melt was homogenized by stirring timely. Subsequently, the melt was poured into a mold and gradually cooled to a room temperature, and thus, the clad glass was obtained.

To check thermal properties and optical properties of the obtained clad glass, the refractive index $nd_2$, the glass-transition temperature $Tg_2$, and the linear thermal expansion coefficient $\alpha_2$ at from 100 to 300° C. were measured. Tables 4 and 5 show the results.

In Tables 4 and 5, "stability" indicates a result of assessment of clad glass stability. While the aforementioned stirring was performed for 2 minutes, when crystallization of glass was confirmed visually, the clad glass was assessed as "bad", and when crystallization of glass was not confirmed visually, the clad glass was assessed as "good".

TABLE 1

|  | Comparative Example Fiber 1 | Comparative Example Fiber 2 | Comparative Example Fiber 3 | Comparative Example Fiber 4 | Comparative Example Fiber 5 | Comparative Example Fiber 6 | Comparative Example Fiber 7 |
| --- | --- | --- | --- | --- | --- | --- | --- |
| Core | Core 1 | Core 2 | Core 1 | Core 1 | Core 32 | Core 6 | Core 4 |
| Clad | Clad 19 | Clad 1 | Clad 21 | Clad 21 | Clad 16 | Clad 25 | Clad 15 |
| Numerical Aperture NA | 0.496 | 0.580 | 0.493 | 0.493 | 0.741 | 0.765 | 0.444 |
| Linear thermal expansion coefficient difference $\Delta\alpha$ (= $\alpha_1 - \alpha_2$) ($\times 10^{-7}/°$ C.) | −2.0 | −10.0 | 0.0 | 0.0 | 19.0 | −5.0 | 4.0 |
| Core glass-transition temperature $Tg_1$ − Clad glass-transition temperature $Tg_2$ (° C.) | 66 | 135 | 56 | 56 | 104 | 163 | −3 |

TABLE 1-continued

| | | | | | | | |
|---|---|---|---|---|---|---|---|
| Core occupancy area ratio (%) | 24.0 | 70.0 | 73.0 | 40.0 | 30.0 | 40.0 | 30.0 |
| Pixel density (pixel/μm²) | 0.07 | 0.01 | 0.10 | 0.10 | 0.10 | 0.10 | 0.10 |
| Occurrence of cracks | Absent | Present | Absent | Absent | Present | Present | Present |
| Results of USAF chart test | Poor | — | Fair | Fair | — | — | — |

| | Comparative Example Fiber 8 | Example Fiber 1 | Example Fiber 2 | Example Fiber 3 | Example Fiber 4 | Example Fiber 5 | Example Fiber 6 | Example Fiber 7 |
|---|---|---|---|---|---|---|---|---|
| Core | Core 28 | Core 3 | Core 28 | Core 38 | Core 33 | Core 33 | Core 29 | Core 30 |
| Clad | Clad 20 | Clad 21 | Clad 21 | Clad 20 | Clad 20 | Clad 25 | Clad 21 | Clad 29 |
| Numerical Aperture NA | 0.766 | 0.717 | 0.768 | 0.766 | 0.743 | 0.745 | 0.860 | 0.813 |
| Linear thermal expansion coefficient difference $\Delta\alpha$ (= $\alpha_1 - \alpha_2$) (×$10^{-7}$/° C.) | 4.0 | −2.0 | 9.0 | 4.0 | −3.0 | −1.0 | 9.0 | 11.0 |
| Core glass-transition temperature $Tg_1$ − Clad glass-transition temperature $Tg_2$ (° C.) | 124 | 170 | 127 | 124 | 157 | 146 | 128 | 95 |
| Core occupancy area ratio (%) | 40.0 | 40.0 | 40.0 | 30.0 | 48.0 | 34.0 | 40.0 | 40.0 |
| Pixel density (pixel/μm²) | 0.05 | 0.10 | 0.19 | 0.40 | 0.17 | 0.20 | 0.10 | 0.10 |
| Occurrence of cracks | Absent | Absent | Absent | Absent | Absent | Absent | Absent | Absent |
| Results of USAF chart test | Poor | Good | Excellent | Excellent | Excellent | Excellent | Good | Good |

TABLE 2

| | | Core 1 | Core 2 | Core 3 | Core 4 | Core 5 | Core 6 | Core 7 | Core 8 |
|---|---|---|---|---|---|---|---|---|---|
| $SiO_2$ | mol % | 56.6 | 53.0 | 55.6 | 34.0 | 50.0 | 48.0 | 36.0 | 42.5 |
| $B_2O_3$ | | 5.8 | 10.4 | 5.8 | 17.0 | 10.0 | 6.5 | 22.0 | 15.0 |
| $Al_2O_3$ | | 3.1 | — | 3.1 | — | — | — | — | 4.0 |
| ZnO | | 9.0 | 7.8 | 8.8 | 2.0 | 3.0 | 4.0 | 1.5 | 4.0 |
| CaO | | — | — | — | 1.0 | 1.0 | 3.0 | — | 3.0 |
| SrO | | — | — | — | 1.0 | 1.0 | — | — | — |
| BaO | | 17.4 | 17.6 | 17.1 | 32.0 | 25.0 | 26.0 | 27.0 | 21.0 |
| $La_2O_3$ | | — | 1.8 | — | 5.0 | 6.0 | 7.0 | 7.0 | 4.0 |
| $Nb_2O_5$ | | — | — | — | — | — | — | — | — |
| $Ta_2O_5$ | | — | — | — | 2.0 | 2.0 | 3.0 | 1.0 | 0.5 |
| $ZrO_2$ | | 0.7 | 2.0 | 0.7 | 1.0 | 2.0 | 2.5 | 0.5 | 1.0 |
| $Li_2O$ | | 1.6 | — | 3.2 | — | — | — | 2.0 | 1.0 |
| $Na_2O$ | | 4.9 | 6.9 | 4.9 | 5.0 | — | — | 2.0 | 4.0 |
| $K_2O$ | | 0.9 | 0.5 | 0.8 | — | — | — | 1.0 | — |
| Total | | 100.0 | 100.0 | 100.0 | 100.0 | 100.0 | 100.0 | 100.0 | 100.0 |
| ZnO + CaO + SrO | mol % | 9.0 | 7.8 | 8.8 | 4.0 | 5.0 | 7.0 | 1.5 | 7.0 |
| $Li_2O + Na_2O + K_2O$ | | 7.4 | 7.4 | 8.9 | 5.0 | 0.0 | 0.0 | 5.0 | 5.0 |
| Refractive index $nd_1$ | | 1.5960 | 1.6200 | 1.5980 | 1.7012 | 1.6997 | 1.7284 | 1.6895 | 1.6545 |
| Glass-transition temperature $Tg_1$ (° C.) | | 573 | 595 | 543 | 569 | 694 | 704 | 583 | 582 |
| Linear thermal expansion coefficient $\alpha_1$ at from 100 to 300° C. (×$10^{-7}$/° C.) | | 85.0 | 88.0 | 88.0 | 106.0 | 82.0 | 88.0 | 98.0 | 92.0 |
| Stability | | Good | Good | Good | Good | Good | Good | Good | Good |

| | | Core 9 | Core 10 | Core 11 | Core 12 | Core 13 | Core 14 | Core 15 | Core 16 |
|---|---|---|---|---|---|---|---|---|---|
| $SiO_2$ | mol % | 48.0 | 36.0 | 36.0 | 48.0 | 36.0 | 48.0 | 39.5 | 42.0 |
| $B_2O_3$ | | 7.0 | 13.5 | 14.3 | 13.0 | 15.5 | 12.5 | 12.0 | 15.0 |
| $Al_2O_3$ | | — | — | — | — | — | 1.5 | — | — |
| ZnO | | 9.0 | — | — | 4.0 | — | 4.0 | — | 3.0 |
| CaO | | — | 5.0 | — | 4.0 | — | 2.0 | 1.0 | 3.0 |
| SrO | | — | — | 5.0 | 4.0 | — | — | 2.0 | — |
| BaO | | 23.0 | 31.0 | 30.0 | 17.0 | 34.0 | 20.0 | 30.0 | 25.0 |
| $La_2O_3$ | | 8.0 | 8.0 | 8.0 | 4.0 | 8.0 | 2.5 | 9.0 | 4.0 |
| $Nb_2O_5$ | | — | — | — | — | — | — | — | — |
| $Ta_2O_5$ | | 3.0 | 3.5 | 3.5 | 1.0 | 3.5 | 0.5 | 3.5 | 0.4 |
| $ZrO_2$ | | 2.0 | 3.0 | 3.0 | 2.0 | 3.0 | 1.0 | 3.0 | 1.1 |
| $Li_2O$ | | — | — | — | — | — | 2.0 | — | 4.0 |
| $Na_2O$ | | — | — | — | 3.0 | — | 5.0 | — | 1.5 |
| $K_2O$ | | — | — | — | — | — | 1.0 | — | 1.0 |
| Total | | 100.0 | 100.0 | 100.0 | 100.0 | 100.0 | 100.0 | 100.0 | 100.0 |
| ZnO + CaO + SrO | mol % | 9.0 | 5.0 | 5.0 | 12.0 | 0.0 | 6.0 | 3.0 | 6.0 |
| $Li_2O + Na_2O + K_2O$ | | 0.0 | 0.0 | 0.0 | 3.0 | 0.0 | 8.0 | 0.0 | 6.5 |
| Refractive index $nd_1$ | | 1.7314 | 1.7494 | 1.7458 | 1.6680 | 1.7451 | 1.6376 | 1.7487 | 1.6689 |
| Glass-transition temperature $Tg_1$ (° C.) | | 702 | 682 | 672 | 637 | 662 | 568 | 696 | 559 |

TABLE 2-continued

| | | | | | | | | |
|---|---|---|---|---|---|---|---|---|
| Linear thermal expansion coefficient $\alpha_1$ at from 100 to 300° C. ($\times 10^{-7}$/° C.) | 82.0 | 96.0 | 96.0 | 85.0 | 95.0 | 92.0 | 94.0 | 97.0 |
| Stability | Good | Good | Good | Good | Good | Bad | Good | Good |

TABLE 3

| | | Core 17 | Core 18 | Core 19 | Core 20 | Core 21 | Core 22 | Core 23 | Core 24 | Core 25 |
|---|---|---|---|---|---|---|---|---|---|---|
| $SiO_2$ | mol % | 36.0 | 43.0 | 36.0 | 43.2 | 38.0 | 38.7 | 36.0 | 48.0 | 45.0 |
| $B_2O_3$ | | 15.0 | 15.0 | 14.0 | 10.1 | 15.7 | 11.5 | 19.0 | 7.0 | 8.0 |
| $Al_2O_3$ | | — | — | — | — | — | 1.0 | — | — | — |
| ZnO | | — | 2.2 | 4.0 | — | 4.0 | 2.0 | — | 4.0 | — |
| CaO | | — | 2.5 | — | 1.3 | — | 2.9 | — | — | — |
| SrO | | 2.0 | — | — | — | — | — | 3.0 | — | — |
| BaO | | 32.0 | 22.0 | 25.0 | 24.7 | 25.0 | 27.0 | 32.0 | 26.0 | 24.0 |
| $La_2O_3$ | | 8.0 | 4.0 | 8.0 | 7.0 | 5.0 | 4.5 | 4.0 | 7.0 | 8.0 |
| $Nb_2O_5$ | | — | — | — | — | — | — | — | — | — |
| $Ta_2O_5$ | | 4.0 | 2.0 | 1.0 | 1.2 | 2.5 | 1.2 | 3.0 | 3.0 | 3.5 |
| $ZrO_2$ | | 3.0 | 0.3 | 8.0 | 3.5 | 1.0 | 1.7 | 3.0 | 2.0 | 3.5 |
| $Li_2O$ | | — | 3.0 | 4.0 | 9.0 | — | — | — | 3.0 | 8.0 |
| $Na_2O$ | | — | 3.0 | — | — | 8.8 | 3.5 | — | — | — |
| $K_2O$ | | — | 1.0 | — | — | — | 6.0 | — | — | — |
| Total | | 100.0 | 100.0 | 100.0 | 100.0 | 100.0 | 100.0 | 100.0 | 100.0 | 100.0 |
| ZnO + CaO + SrO | mol % | 2.0 | 4.7 | 4.0 | 1.3 | 4.0 | 4.9 | 3.0 | 4.0 | 0.0 |
| $Li_2O + Na_2O + K_2O$ | | 0.0 | 7.0 | 4.0 | 9.0 | 8.8 | 9.5 | 0.0 | 3.0 | 8.0 |
| Refractive index $nd_1$ | | 1.7504 | 1.6729 | — | 1.7105 | 1.6893 | 1.6708 | 1.7131 | 1.7252 | 1.7373 |
| Glass-transition temperature $Tg_1$ (° C.) | | 679 | 573 | — | 581 | 562 | 545 | 662 | 646 | 621 |
| Linear thermal expansion coefficient $\alpha_1$ at from 100 to 300° C. ($\times 10^{-7}$/° C.) | | 95.0 | 92.0 | — | 99.0 | 101.0 | 110.0 | 92.0 | 89.0 | 94.0 |
| Stability | | Good | Good | Bad | Good | Good | Good | Good | Good | Good |

| | | Core 26 | Core 27 | Core 28 | Core 29 | Core 30 | Core 31 | Core 32 | Core 33 |
|---|---|---|---|---|---|---|---|---|---|
| $SiO_2$ | mol % | 48.0 | 40.0 | 36.0 | 45.0 | 43.7 | 39.7 | 43.0 | 41.7 |
| $B_2O_3$ | | 7.0 | 11.0 | 18.4 | 8.3 | 7.9 | 11.7 | 7.0 | 16.8 |
| $Al_2O_3$ | | — | — | — | — | — | 3.0 | — | — |
| ZnO | | 2.3 | 3.0 | 0.7 | — | — | 1.6 | — | 0.6 |
| CaO | | — | 4.0 | 3.0 | — | — | — | — | 2.8 |
| SrO | | 3.0 | 4.0 | 3.8 | — | — | — | — | 3.5 |
| BaO | | 28.0 | 22.0 | 28.5 | 30.0 | 27.1 | 30.0 | 28.0 | 26.0 |
| $La_2O_3$ | | 5.0 | 5.0 | 5.4 | 5.3 | 7.1 | 7.0 | 5.0 | 4.9 |
| $Nb_2O_5$ | | — | — | — | 6.0 | — | — | — | — |
| $Ta_2O_5$ | | 3.0 | 3.0 | 1.2 | — | 0.7 | 1.0 | 3.0 | 1.1 |
| $ZrO_2$ | | 0.7 | 3.0 | 2.8 | 1.4 | 6.2 | 1.0 | 3.0 | 2.0 |
| $Li_2O$ | | — | 1.0 | — | 4.0 | 7.3 | 2.0 | 4.0 | — |
| $Na_2O$ | | 3.0 | — | — | — | — | — | 1.0 | — |
| $K_2O$ | | — | 4.0 | — | — | — | 1.0 | 1.0 | — |
| Total | | 100.0 | 100.0 | 100.0 | 100.0 | 100.0 | 100.0 | 100.0 | 100.0 |
| ZnO + CaO + SrO | mol % | 5.3 | 11.0 | 7.5 | 0.0 | 0.0 | 1.6 | 0.0 | 6.9 |
| $Li_2O + Na_2O + K_2O$ | | 3.0 | 5.0 | 0.0 | 4.0 | 7.3 | 3.0 | 6.0 | 0.0 |
| Refractive index $nd_1$ | | 1.7053 | 1.7124 | 1.7014 | 1.7450 | 1.7230 | 1.7405 | 1.7109 | 1.6910 |
| Glass-transition temperature $Tg_1$ (° C.) | | 654 | 637 | 644 | 645 | 607 | 619 | 624 | 677 |
| Linear thermal expansion coefficient $\alpha_1$ at from 100 to 300° C. ($\times 10^{-7}$/° C.) | | 94.0 | 95.0 | 94.0 | 92.0 | 93.0 | 92.0 | 94.0 | 87.0 |
| Stability | | Good | Good | Good | Good | Good | Good | Good | Good |

TABLE 4

| | | Clad 1 | Clad 2 | Clad 3 | Clad 4 | Clad 5 | Clad 6 | Clad 7 | Clad 8 |
|---|---|---|---|---|---|---|---|---|---|
| $SiO_2$ | mol % | 65.1 | 45.7 | 69.3 | 66.6 | 58.0 | 64.3 | 54.2 | 59.6 |
| $B_2O_3$ | | 3.2 | 11.7 | 7.6 | 3.3 | 20.9 | 17.8 | 7.7 | 9.4 |
| $Al_2O_3$ | | 4.9 | 7.6 | 2.2 | 3.1 | 1.6 | 0.2 | 17.0 | 3.5 |
| MgO | | 8.8 | 3.3 | 10.0 | — | 5.4 | 3.0 | — | 8.9 |

TABLE 4-continued

|  |  |  |  |  |  |  |  |  |
|---|---|---|---|---|---|---|---|---|
| CaO | — | 4.4 | 1.1 | — | 3.4 | — | — | 1.0 |
| ZnO | — | 5.5 | — | 10.3 | 1.2 | 3.8 | 6.3 | — |
| Li$_2$O | 7.9 | 4.4 | — | — | — | 5.1 | — | 8.0 |
| Na$_2$O | 4.8 | 8.7 | 6.6 | 9.5 | 5.1 | 4.8 | 14.8 | 5.8 |
| K$_2$O | 6.3 | 8.7 | 3.2 | 7.2 | 4.4 | 1.0 | — | 3.8 |
| Total | 100.0 | 100.0 | 100.0 | 100.0 | 100.0 | 100.0 | 100.0 | 100.0 |
| MgO + CaO + ZnO    mol % | 8.8 | 13.2 | 11.1 | 10.3 | 10.0 | 6.8 | 6.3 | 9.9 |
| Li$_2$O + Na$_2$O + K$_2$O | 19.0 | 21.8 | 9.8 | 16.7 | 9.5 | 10.9 | 14.8 | 17.6 |
| Refractive index nd$_2$ | 1.514 | 1.537 | 1.503 | 1.522 | 1.512 | 1.512 | 1.516 | 1.524 |
| Glass-transition temperature Tg$_2$ (° C.) | 460 | 468 | 583 | 555 | 548 | 502.0 | 595.0 | 491 |
| Linear thermal expansion coefficient α$_2$ at from 100 to 300° C. (×10$^{-7}$/° C.) | 98.0 | 112.0 | 68.4 | 102.6 | 68.0 | 59.1 | 76.5 | 93.0 |
| Stability | Good | Good | Good | Good | Good | Bad | Good | Good |

|  |  | Clad 9 | Clad 10 | Clad 11 | Clad 12 | Clad 13 | Clad 14 | Clad 15 | Clad 16 |
|---|---|---|---|---|---|---|---|---|---|
| SiO$_2$ | mol % | 60.1 | 50.4 | 59.7 | 60.0 | 53.3 | 61.7 | 54.7 | 62.9 |
| B$_2$O$_3$ |  | 16.4 | 12.3 | 9.0 | 20.0 | 8.1 | 9.8 | 12.9 | 13.0 |
| Al$_2$O$_3$ |  | 3.7 | 5.8 | 10.0 | 7.0 | 8.8 | 4.0 | 3.5 | 2.0 |
| MgO |  | 3.2 | — | 2.0 | 4.0 | — | — | 13.3 | — |
| CaO |  | — | 2.5 | — | — | — | — | — | 10.1 |
| ZnO |  | 7.0 | 5.0 | 1.0 | 5.0 | 4.3 | 12.9 | — | — |
| Li$_2$O |  | 5.3 | — | 3.7 | 2.0 | 4.6 | 5.6 | 4.0 | 4.0 |
| Na$_2$O |  | — | 24.0 | 2.8 | 2.0 | 15.3 | 6.0 | 9.6 | 3.0 |
| K$_2$O |  | 4.3 | — | 11.8 | — | 5.6 | — | 2.0 | 5.0 |
| Total |  | 100.0 | 100.0 | 100.0 | 100.0 | 100.0 | 100.0 | 100.0 | 100.0 |
| MgO + CaO + ZnO | mol % | 10.2 | 7.5 | 3.0 | 9.0 | 4.3 | 12.9 | 13.3 | 10.1 |
| Li$_2$O + Na$_2$O + K$_2$O |  | 9.6 | 24.0 | 18.3 | 4.0 | 25.5 | 11.6 | 15.6 | 12.0 |
| Refractive index nd$_2$ |  | 1.514 | 1.531 | 1.510 | 1.500 | 1.525 | 1.531 | 1.535 | 1.531 |
| Glass-transition temperature Tg$_2$ (° C.) |  | 502 | 520 | 510 | 553 | 464 | 497 | 546 | 539 |
| Linear thermal expansion coefficient α$_2$ at from 100 to 300° C. (×10$^{-7}$/° C.) |  | 57.1 | 107.9 | 96.0 | 39.4 | 121.1 | 63.4 | 84.0 | 75.0 |
| Stability |  | Good | Good | Good | Good | Good | Good | Good | Good |

TABLE 5

|  |  | Clad 17 | Clad 18 | Clad 19 | Clad 20 | Clad 21 | Clad 22 | Clad 23 | Clad 24 |
|---|---|---|---|---|---|---|---|---|---|
| SiO$_2$ | mol % | 55.2 | 54.6 | 63.9 | 50.0 | 62.9 | 51.2 | 58.4 | 62.9 |
| B$_2$O$_3$ |  | 19.0 | 12.9 | 12.0 | 16.2 | 10.0 | 10.5 | 10.9 | 10.0 |
| Al$_2$O$_3$ |  | 9.8 | 1.8 | 5.0 | 9.9 | 2.0 | 14.0 | 3.6 | 2.0 |
| MgO |  | — | 8.9 | — | — | 9.0 | — | 9.0 | 8.9 |
| CaO |  | — | 6.3 | 3.0 | — | 1.0 | — | — | 1.1 |
| ZnO |  | — | — | — | 6.6 | — | 7.9 | — | — |
| Li$_2$O |  | — | 4.0 | 4.1 | — | 4.0 | — | 4.0 | 4.0 |
| Na$_2$O |  | 16.0 | 9.6 | 7.0 | 17.3 | 6.1 | 16.4 | 12.2 | 3.0 |
| K$_2$O |  | — | 1.9 | 5.0 | — | 5.0 | — | 1.9 | 8.1 |
| Total |  | 100.0 | 100.0 | 100.0 | 100.0 | 100.0 | 100.0 | 100.0 | 100.0 |
| MgO + CaO + ZnO | mol % | 0.0 | 15.2 | 3.0 | 6.6 | 10.0 | 7.9 | 9.0 | 10.0 |
| Li$_2$O + Na$_2$O + K$_2$O |  | 16.0 | 15.5 | 16.1 | 17.3 | 15.1 | 16.4 | 18.1 | 15.1 |
| Refractive index nd$_2$ |  | 1.505 | 1.543 | 1.517 | 1.519 | 1.518 | 1.518 | 1.528 | 1.515 |
| Glass-transition temperature Tg$_2$ (° C.) |  | 521 | 523 | 507 | 520 | 517 | 546 | 525 | 514 |
| Linear thermal expansion coefficient α$_2$ at from 100 to 300° C. (×10$^{-7}$/° C.) |  | 93.8 | 86.0 | 87.0 | 90.0 | 85.0 | 86.0 | 85.0 | 85.0 |
| Stability |  | Good | Good | Good | Good | Good | Good | Good | Good |

|  |  | Clad 25 | Clad 26 | Clad 27 | Clad 28 | Clad 29 | Clad 30 | Clad 31 |
|---|---|---|---|---|---|---|---|---|
| SiO$_2$ | mol % | 51.0 | 60.9 | 63.1 | 66.4 | 58.5 | 67.0 | 89.5 |
| B$_2$O$_3$ |  | 15.9 | 12.0 | 16.8 | 11.4 | 12.0 | 12.7 | 19.6 |
| Al$_2$O$_3$ |  | 9.7 | 5.0 | 3.9 | 2.2 | 3.9 | 2.1 | 4.5 |
| MgO |  | — | — | 3.2 | 3.5 | 9.2 | 9.4 | 3.2 |
| CaO |  | — | 9.9 | — | — | 1.1 | 4.5 | — |
| ZnO |  | 6.5 | — | — | — | — | — | — |

TABLE 5-continued

|  | | | | | | | |
|---|---|---|---|---|---|---|---|
| Li$_2$O | | 2.2 | 2.1 | 4.6 | 4.1 | 3.0 | 1.1 |
| Na$_2$O | 16.9 | 3.0 | 5.9 | 6.5 | 6.0 | 6.3 | 6.3 |
| K$_2$O | — | 7.0 | 5.0 | 5.4 | 5.2 | — | 5.8 |
| Total | 100.0 | 100.0 | 100.0 | 100.0 | 100.0 | 100.0 | 100.0 |
| MgO + CaO + ZnO   mol % | 6.5 | 9.9 | 3.2 | 3.5 | 10.3 | 13.9 | 3.2 |
| Li$_2$O + Na$_2$O + K$_2$O | 16.9 | 12.2 | 13.0 | 16.5 | 15.3 | 9.3 | 13.2 |
| Refractive index nd$_2$ | 1.518 | 1.524 | 1.510 | 1.512 | 1.519 | 1.530 | 1.508 |
| Glass-transition temperature Tg$_2$ (° C.) | 531 | 556 | 538 | 526 | 512 | 558 | 509 |
| Linear thermal expansion coefficient $\alpha_2$ at from 100 to 300° C. (×10$^{-7}$/° C.) | 87.0 | 80.0 | 76.0 | 83.2 | 87.0 | 71.1 | 76.0 |
| Stability | Good | Good | Good | Good | Good | Good | Good |

As can be seen from Table 1, in Example Fibers, occurrence of cracks was not observed at the time of manufacturing fibers, and the image qualities were better than those of Comparative Example Fibers.

INDUSTRIAL APPLICABILITY

An image guide fiber according to the present disclosure may be suitably used for image transmission in, for example, an endoscope for medical or industrial applications.

REFERENCE SIGNS LIST

1 Image guide fiber
1a Incident end surface
1b Emission end surface
2 Light guide fiber
3 Objective lens
4 Ocular lens
10 Scope of endoscope
11 Operation portion
12 Insertion portion
13 Front end portion
20 Observed object
30 Monitor
51 Core
52 Clad
60 Screen portion
70 Jacket layer
80 Coat layer
110 Single core fiber bundle
120 Single core fiber
151 Core glass
152 Clad glass
170 Glass tube

The invention claimed is:

1. An image guide fiber comprising a plurality of cores and a clad which is common to the plurality of cores, wherein
the cores and the clad are each made of multi-component glass,
the image guide fiber has a numerical aperture NA in the range of 0.70 to 0.90,
a linear thermal expansion coefficient difference $\Delta\alpha$, which is a value obtained by subtracting a linear thermal expansion coefficient $\alpha_2$ at from 100° C. to 300° C. of a clad glass of the clad, from a linear thermal expansion coefficient $\alpha_1$ at from 100° C. to 300° C. of a core glass of the cores, is in the range of $-3\times10^{-7}$/° C. to $15\times10^{-7}$/° C.,
a glass-transition temperature Tg$_1$ of the core glass is higher than a glass-transition temperature Tg$_2$ of the clad glass,
in a section of the image guide fiber, a core occupancy area ratio is 25% or more, where the core occupancy area ratio is a ratio of a total area of the plurality of cores to an area of a screen portion defined by an outer circumferential edge of the clad, and
in the section of the image guide fiber, a pixel density is 0.1 pixel/μm$^2$ or more, where the pixel density is the number of pixels per unit area of the screen portion.

2. The image guide fiber according to claim 1, wherein the core glass has
a refractive index nd$_1$ in the range of 1.690 to 1.745,
the glass-transition temperature Tg$_1$ of 605° C. or more, and
the linear thermal expansion coefficient $\alpha_1$ at from 100° C. to 300° C. of 86×10$^{-7}$/° C. or more.

3. The image guide fiber according to claim 1, wherein the core glass has a composition,
expressed in mol %, containing
SiO$_2$: 36% to 48%,
B$_2$O$_3$: 7% to 19%,
Al$_2$O$_3$: 0% to 3.5%,
ZnO: 0% to 4%,
CaO: 0% to 4.5%,
SrO: 0% to 4.5%,
BaO: 20% to 33%,
La$_2$O$_3$: 4% to 8%,
Ta$_2$O$_5$: 0.5% to 3.5%,
ZrO$_2$: 0.5% to 7%,
Li$_2$O: 0% to 8%,
Na$_2$O: 0% to 5%, and
K$_2$O: 0% to 5%, wherein
a total percentage of Li$_2$O, Na$_2$O, and K$_2$O is from 0% to 8%.

4. The image guide fiber according to claim 1, wherein the clad glass has
a refractive index nd$_2$ in the range of 1.490 to 1.530,
the glass-transition temperature Tg$_2$ of 570° C. or less, and
the linear thermal expansion coefficient $\alpha_2$ at from 100° C. to 300° C. of 95×10$^{-7}$/° C. or less.

5. The image guide fiber according to claim 1, wherein the clad glass has a composition,
expressed in mol %, containing
SiO$_2$: 46% to 67%,
B$_2$O$_3$: 7% to 20%,
Al$_2$O$_3$: 1% to 15%,
MgO: 0% to 12%,
CaO: 0% to 10%, ZnO: 0% to 11%,
Li$_2$O: 0% to 6%,
Na$_2$O: 2% to 20%, and
K$_2$O: 0% to 9%, wherein
a total percentage of MgO, CaO, and ZnO is from 3% to 14%, and
a total percentage of Li$_2$O, Na$_2$O, and K$_2$O is from 6% to 24%.

* * * * *